United States Patent [19]

Kallenberg

[11] Patent Number: 4,843,410

[45] Date of Patent: Jun. 27, 1989

[54] CAMERA AND PROJECTOR ALIGNMENT FOR FRONT SCREEN PROJECTION SYSTEM

[75] Inventor: Karl J. Kallenberg, Richfield, Minn.

[73] Assignee: Lifetouch National School Studios Inc., Minneapolis, Minn.

[21] Appl. No.: 152,249

[22] Filed: Feb. 4, 1988

[51] Int. Cl.⁴ .............................................. G03B 29/00
[52] U.S. Cl. ....................................... 354/77; 354/291
[58] Field of Search .................................. 354/77, 291

[56] References Cited

U.S. PATENT DOCUMENTS

| 3,227,509 | 1/1966 | Baker | 354/291 X |
| 3,911,450 | 10/1975 | Schwartz | 354/77 |
| 4,183,644 | 1/1980 | Tureck et al. | 354/291 X |

Primary Examiner—Michael L. Gellner
Attorney, Agent, or Firm—Kinney & Lange

[57] ABSTRACT

An alignment mechanism for a detachably linked camera and projector for a front screen projection system is disclosed. The alignment mechanism, after initial adjustment, returns the camera and projector to the appropriate alignment for projecting optical images along the optical axis of the camera for recording composite optical images.

16 Claims, 4 Drawing Sheets

CAMERA AND PROJECTOR ALIGNMENT FOR FRONT SCREEN PROJECTION SYSTEM

CROSS REFERENCE TO RELATED APPLICATIONS

An improved projector used in the front screen projection system of the present invention is shown in U.S. application Ser. No. 152,072 by Karl J. Kallenberg and Ronald Harvey, filed concurrently herewith, the disclosure of which is hereby incorporated by reference.

An improved slide holder used with the projector in the present front screen projection system is shown in U.S. application Ser. No. 152,647 by Karl Kallenberg, filed concurrently herewith, the disclosure of which is hereby incorporated by reference.

BACKGROUND OF THE INVENTION

1. Field of the Invention

The invention relates to an apparatus for the production of composite optical images. More particularly, it relates to an apparatus which allows any one of a plurality of scenes to appear as backdrop scenery in portrait still photography. More particularly still, it relates to such an apparatus whereby the system is portable and relatively immune to extraneous lighting effects in the environment in which it is used.

2. Description of the Prior Art

Front screen projection, a technique used in photography and video broadcasting whereby a composite image of real objects and projected images is made is well known. In front screen projection systems, a reflecting screen is placed behind the real object to directionally reflect a projected scenery image back to a camera which records the composite image. A projector is used to project the scenery image onto the screen behind the real object or subject so that it will appear that the subject was photographed at the actual scene of the projected image. The technique permits a wide choice of backdrop scenes without the use of props.

The best results for such photography are realized when the projected background image is centered on the optical axis of the objective of the camera which is used to record the composite image. Where the two axes are not coincident, undesirable optical effects will appear in the photograph, for example, a halo or unnaturally sharp boundaries around the subject. These results in part flow from the fact that the subject blocks a portion of the projected image from the reflecting screen. This is seen by the camera as a gap in the projected image if the camera and projector do not share an optical axis.

It is well known that a projected image may be introduced to the same plane as the optical axis of a recording camera and then be made coincident with the optical axis of the recording camera by use of a beam splitter. Such a method was disclosed in U.S. Pat. No. 2,727,427 issued to Will F. Jenkins.

The Jenkins' patent is directed to providing a front screen projection system for a television or motion picture set. The shortcomings of the apparatus and method taught by Jenkins and the prior art generally has been in provision of such a system which is reasonably portable. A portable system will allow easy assembly with definite alignment of the three critical elements of front screen projection system, the camera, the projector and the beam splitter. Prior art systems have generally been confined to photographers' studios or have failed to provide easy alignment and thus gave poor results in the field. Thus, an advantage will lie with a system which can be easily set up and aligned away from a studio.

SUMMARY OF THE INVENTION

The present invention is a portable front screen projection system which provides for quick relative alignment of the image projection system and the image recording camera.

The invention as described herein may be employed with a commercially available directionally reflective screen. The present invention may be advantageously employed in a school gymnasium by a school portrait still photographer. The reflecting screen employed with the camera includes a highly directional reflecting surface. The subject of the photograph takes their position in front of this backdrop. A front screen projection system, in accordance with the present invention, is employed in front of the subject and backdrop. A black mesh screen, employed essentially as a filter for the reflecting screen, is placed immediately in front of the reflecting screen to reduce the effects of environmental lighting and fill lighting on the projected image. This filter also reduces the intensity of the projected image, but this is overcome by more intense illumination of the background image as set forth in copending application Ser. No. 152,072 incorporated above. The front screen projection system comprises a projector and a camera, which are detachedly linked to one another fixing the optical axis of the camera objective and the optical axis of the projector focusing lens in the same plane. A beam splitter is provided perpendicularly intersecting the plane of the optical axes. The beam splitter is adjustably attached to the projector through a mounting system adapted to allow the beam splitter to sweep the plane of the optical axes. Adjustment of the position of the beam splitter is provided through a cam. The position of the beam splitter is adjusted until the optical axis of the projector's lens and the optical axis of the camera object lens intersect in the beam splitter. The optical axes are then substantially coaxial between the beam splitter and the reflective screen.

DETAILED DESCRIPTION OF THE PREFERRED EMBODIMENTS

Figure 1:
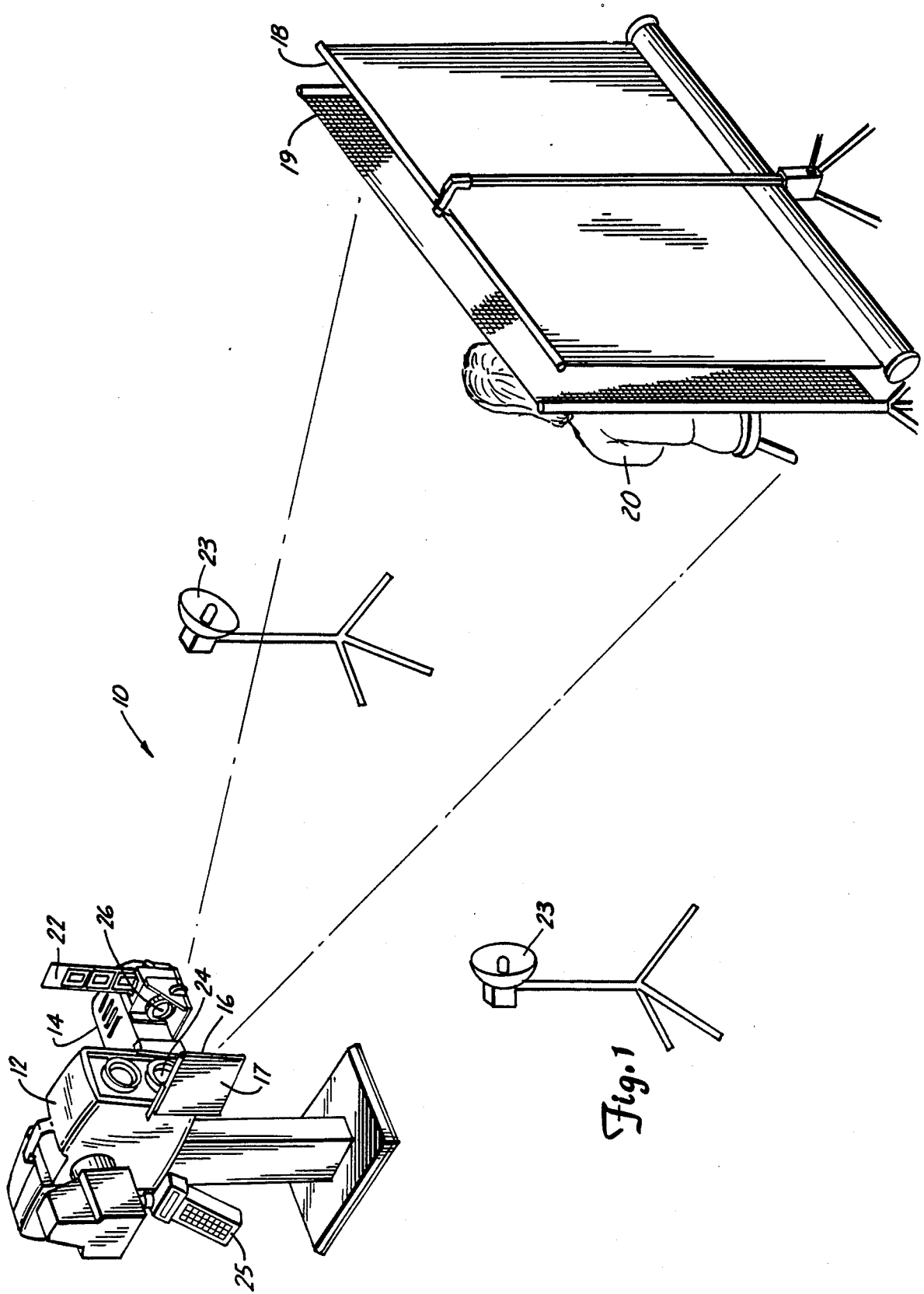
FIG. 1 is a perspective view of a front screen projection system in accordance with the present invention.

In FIG. 1, a front screen projection system 10 is shown. A camera 12 is coupled with a projector 14. The relative alignment of camera 12 and projector 14 is fixed by the mechanism of their attachment so that the optical axis of camera objective lens 24 intersects the optical axis of projector lens 26 at a right angle. A beam splitter 16 is shown extending from the body of the projector at a 45° angle incident to the optical axis of camera objective lens 24 and the optical axis of projector lens 26 and perpendicular to the plane formed by the two optical axes. The position of the beam splitter 16 is adjusted until the optical axis of the objective lens 24 and the projector lens 26 intersect in the beam splitter 16. Accordingly, the image projected by reflection off the beam splitter 16 is on the same optical axis as the camera objective lens 24. A baffle 17 absorbs light from the projector 14 which passes through the beam splitter 16. Accordingly, the image projected off directional reflecting screen 18 will be centered on the optical axis of camera objective lens 24. A control panel 25 is shown extending from the camera 12. A slide carrier 22 holding a plurality of photographic slide transparencies is shown mounted in projector 14. Fill lamps 23 may be used to provide illumination of subject 20. Black mesh screen 19 controls reflection off of screen 18 from fill lamps 23.

Figure 2:
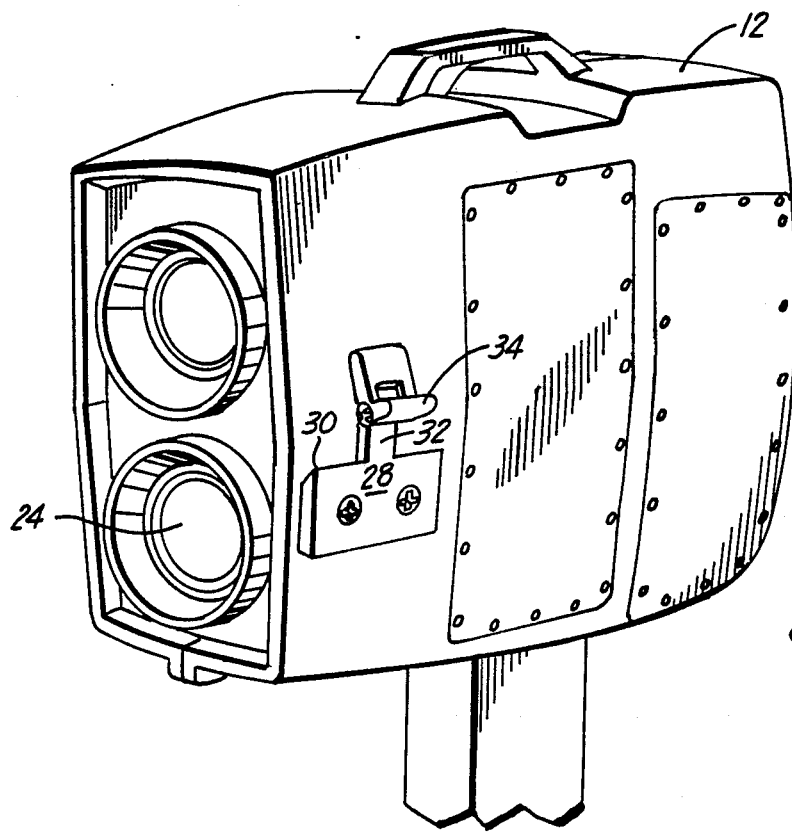
FIG. 2 is a side view of a camera adapted for use in a front screen projection system of the present invention.

FIG. 2 illustrates the attachment mechanism of the present invention. Shoe 28 is mounted on one side of camera 12 and is adapted to receive and fix in position a dovetail foot 38 (shown in FIG. 3) mounted on projector 14. The shoe 28 comprises a dovetail wedge 30 for fixing the position of projector 14 and camera 12 on a first line perpendicular to the optical axis of the camera objective lens 24 and parallel to the optical axis of the projector lens 26. Additionally, shoe 28 supports projector 14 vertically with respect to camera 12. Tangential alignment block 32 fixes the position of projector 14 along a line parallel to the optical axis at camera objective lens 24. Locking lever 34, in combination with dovetail wedge 30, fixes the position of projector 14 on a line parallel to a line perpendicular to the optical axes of both camera objective lens 24 and projector lens 26 to insure that the optical axes intersect.

Figure 3:
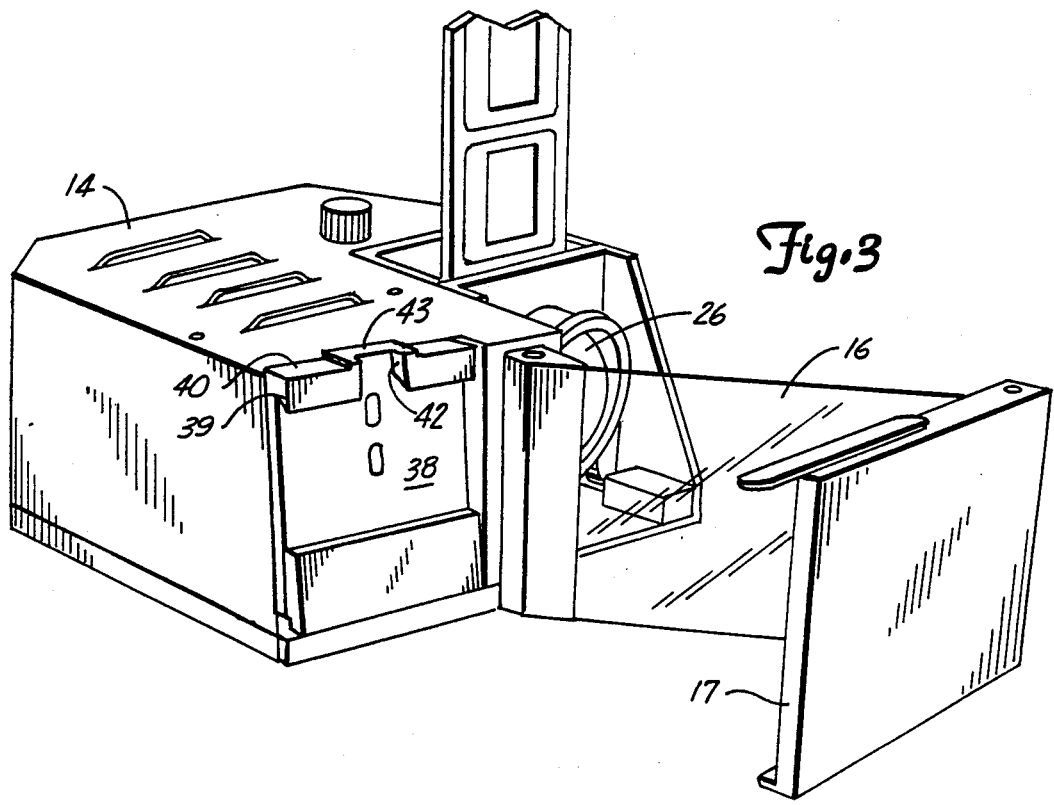
FIG. 3 is a perspective view of a projector adapted to be detachedly attached to the camera of FIG. 2.

FIG. 3 illustrates dovetail foot 38 of projector 14. Dovetail foot 38 may be introduced to the dovetail shoe 28 with the heavy portion of the wedge 39 resting in dovetail wedge 30 of shoe 28. Wedge 39 includes a horizontal alignment gap 42, which is adapted to cradle tangential alignment block 32 of shoe 28 on camera 12. Upper face 40 includes a raised edge 43, against which locking lever 34 will be urged.

Figure 4:
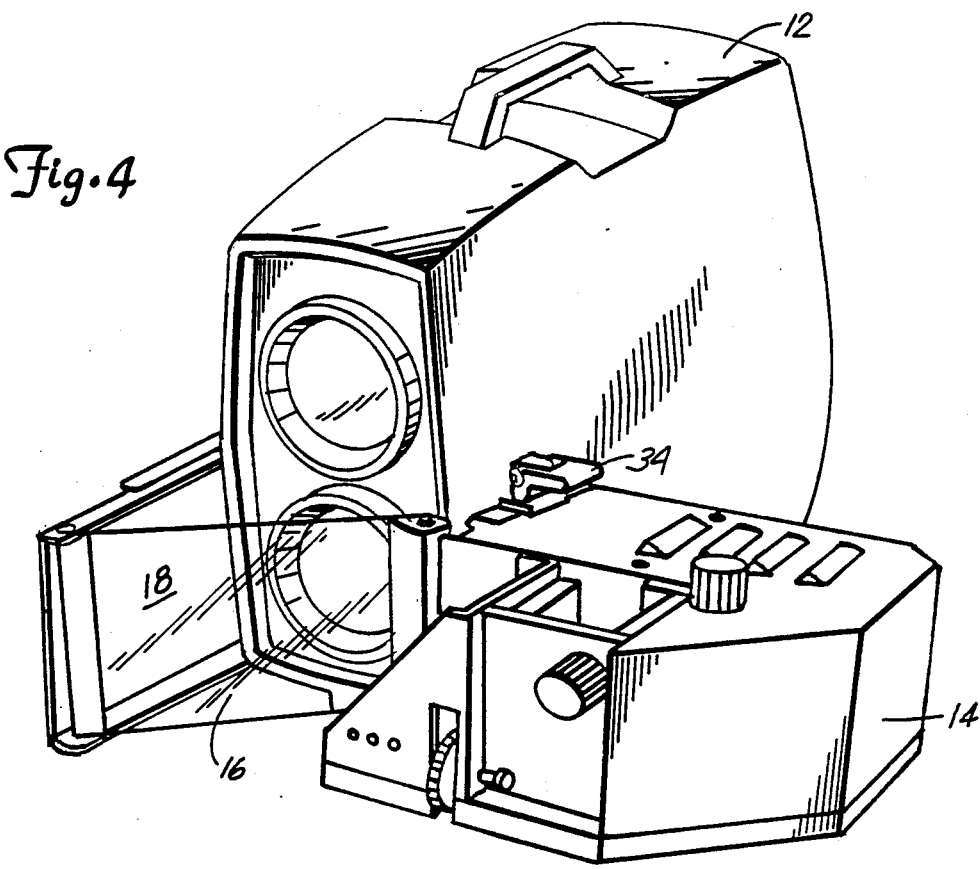
FIG. 4 is a perspective view of a projector attached to a camera in accordance with the present invention.

In FIG. 4, projector 14 is mounted on camera 12 and locked into position thereon by locking lever 34. The dovetail foot and shoe allow quick and definite attachment of the projector 14 to the camera 12. Alignment is an automatic result of the engagement.

Figure 5:
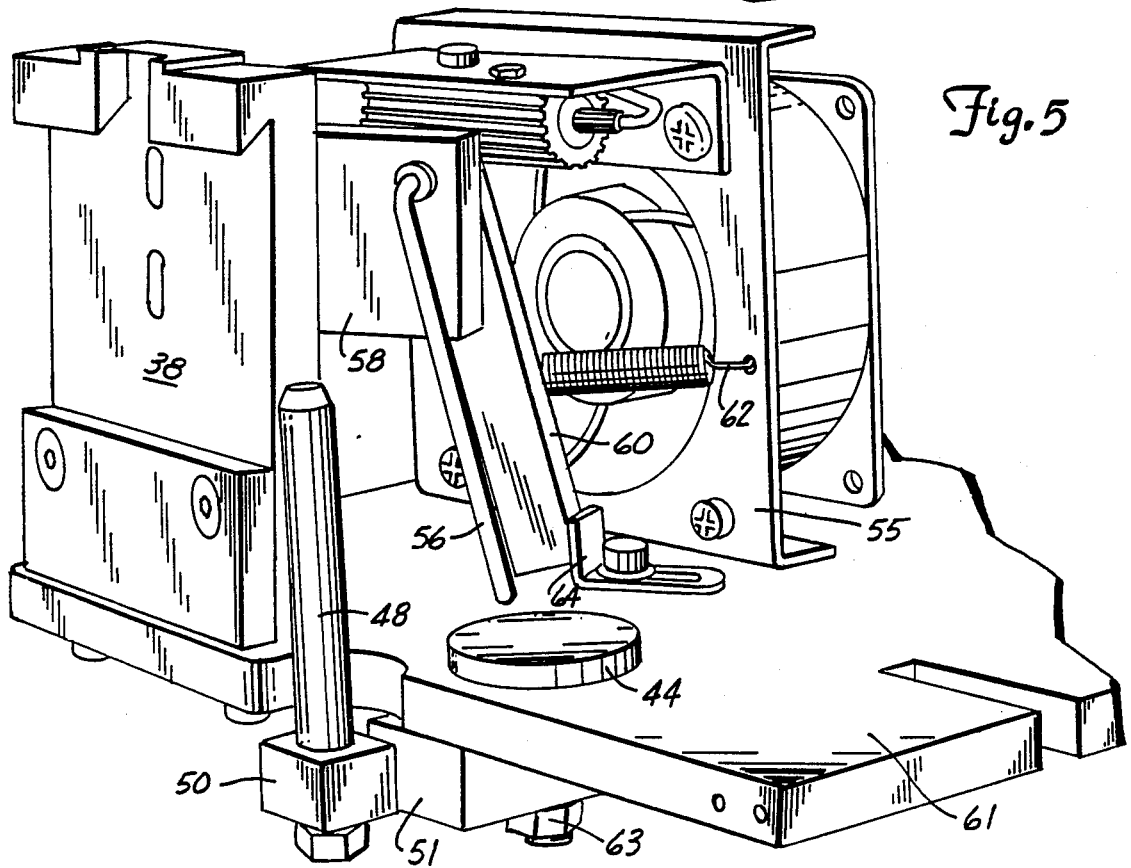
FIG. 5 is a side view of a beam splitter support and adjustment mechanism.

A partial cutaway view of projector 14 showing the mechanism for adjusting the position of beam splitter 16 is illustrated in FIG. 5. Beam splitter 16 is positioned so that the plane of beam splitter 16 is perpendicular to the plane formed by the optical axis of the camera objective lens 24 and the optical axis of the projector lens 26. A pivot shaft 48 is provided to engage beam splitter 16, allowing the beam splitter 16 to be swung through a variety of positions which perpendicularly intersect the aforedescribed plane. An adjustable beam splitter mount support 50 supports beam splitter mount 46 and includes a support shaft clamp 51 to lock the location of beam splitter 16. The mount support 50 permits adjustment of the distance between beam splitter 16 and camera 12.

Dovetail foot 38 of projector 14 supports a bearing block 58 which is adapted to pivotally support spring arm 60 and beam splitter locator 56. Spring arm 60 and beam splitter locator 56 are mechanically coupled to one another through bearing block 58 so that they rotate together. A spring 62 is attached at one end to spring arm 60 and at the other end to frame 55 to urge the locator 56 toward adjusting cam 44. A spring arm stop 64 on support plate 61 limits the travel of spring arm 60 and accordingly the travel of locator 56. Support plate 61 of projector 14 supports adjusting cam 44. An adjusting cam set 63 used to lock the position of the adjusting cam 44 to fix the location of beam splitter 16 after adjustment of the position of the beam splitter 16 is completed.

Figure 6:
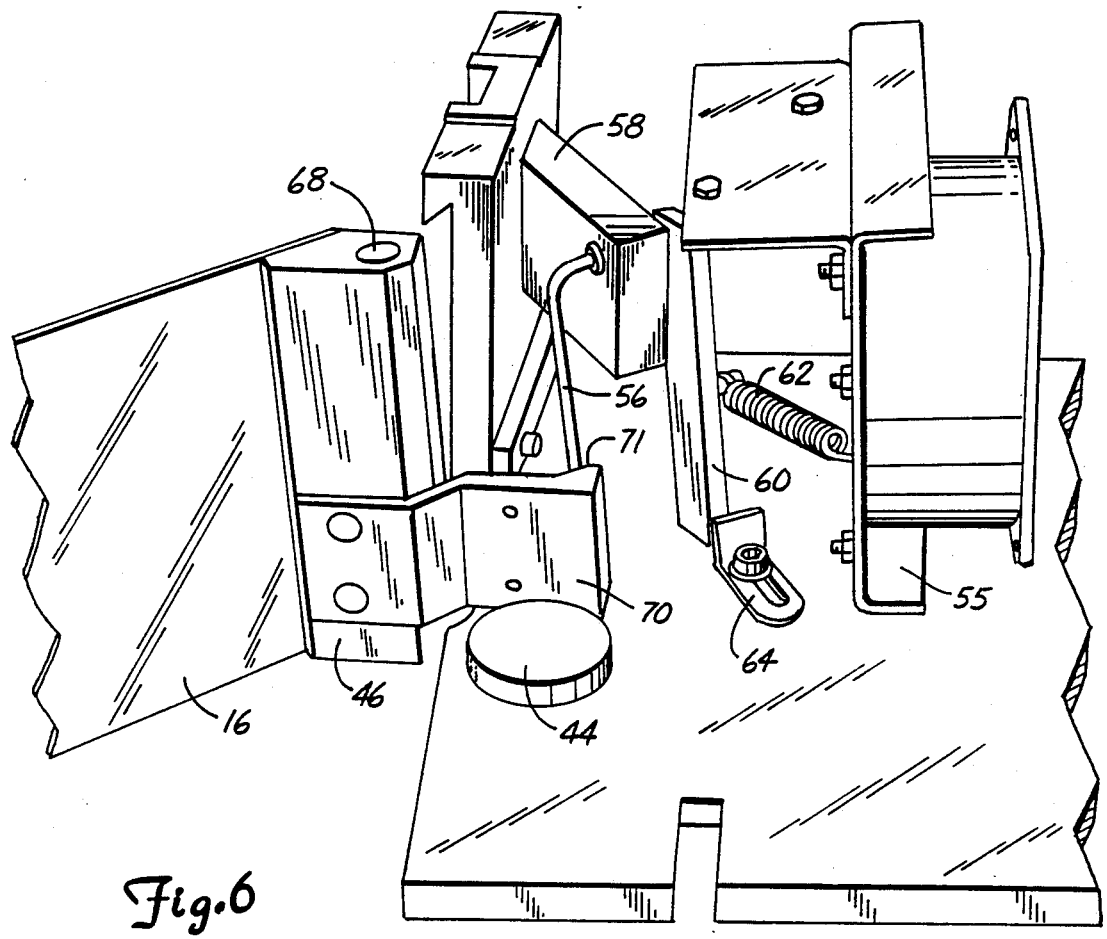
FIG. 6 is a view of a beam splitter and beam splitter mount supported by a beam splitting adjustment mechanism.

FIG. 6 illustrates the beam splitter 16 mounted on projector 14. Beam splitter 16 is supported by a beam splitter mount 46. Beam splitter mount 46 includes a bore 68 which extends through the length of mount 46. Bore 68 is sized to snugly fit pivot shaft 48 as shown. Mount 46 rests on beam splitter support 50. Extending from mount 46 into projector 14 is a positioning arm 70. The front face of positioning arm 70 contacts adjusting cam 44. The back wedge-shaped face 71 is in contact with locator 56. Locator 56 is urged against positioning arm 70 by the spring arm and keeps the positioning arm 70 in snug contact with adjusting cam 44. Beam splitter 16 will rotate about pivot shaft 48 in a direction determined by moving adjusting cam 44 in cooperation with the positioning arm 70. Once the beam splitter 16 has been appropriately adjusted, cam set lock 63 is locked to prevent accidental misadjustment at the beam splitter 16. Beam splitter 16 and beam splitter mount 46 may be conveniently removed from beam splitter support 50 for transport. For reassembly, one need only position mount 46 back on beam splitter support 50. Normally no additional adjustment will be required.

An operator or photographer may conveniently set up the apparatus of the present invention away from an artist's studio. After resting the projector adapter into the dovetail shoe mounted on the camera and locking the same into position, fine adjustment of the beam splitter 16 may be had by rotating adjusting cam 44 until the beam splitter 16 is correctly positioned. After a first time adjustment this will rarely be required. The correct position is that where the optical axis of the camera objective lens 24 intersects the optical axis of projector lens 26 in the beam splitter 16. This is achieved by opening the camera and introducing a point source light generator to the camera in the center of the plane normally occupied by film with the shutter opened, camera 12 will project the point source onto directional reflecting screen 18. Another point is generated by projector 14 and the points are brought into alignment by adjusting the position of beam splitter 16. Correct alignment of the elements of the front screen projection system is essential to produce high quality and natural looking photographs. Failure to project the scenery image on the optical axis of the camera objective lens will generate visible border effects between a real object subject of the photograph and the projected scenery image. The subject, of course, blocks a portion of the projected image from the reflecting screen. If the projected image is not projected on the axis of the camera objective lens 24, a portion of the screen where no image is reflected will be visible and the camera will record the effect.

The reflecting screen 18 employed with the present invention is highly directional. In other words, the projected image is reflected back to the camera in a very narrow solid angle. To the viewer, this means that the projected image will dim very quickly as the viewer moves off the center of the solid angle of reflection. Proper alignment of the optical axes insures that the solid angle of the projected image is centered on the optical axis of camera objective lens 24. Thus camera 12 will record the projected image at its brightest. Good alignment helps control the effects of extraneous lighting and reduces the intensity of lighting required for the projected image. The present invention allows convenient disassembly and transportation from location to location of a front screen projection system while maintaining a high quality of composite image production.

Although the present invention has been described with reference to preferred embodiments, workers skilled in the art will recognize that changes may be made in form and detail without departing from the spirit and scope of the invention.

What is claimed is:

1. A front screen projection system comprising:
   a camera with an optical axis;
   a projector with an optical axis;
   mounting shoe means attached to the camera;
   mounting foot means attached to the projector to detachably engage the mounting shoe means for mounting the projector to the camera whereby the optical axis of the camera and the optical axis of the projector are caused to intersect at substantially the same point notwithstanding repeated assembly and disassembly of the system;
   quick release lever means for locking the mounting foot means into the mounting shoe means;
   beam splitter means for substantially merging the optical axis of the camera and the optical axis of the projector; and
   beam splitter support and alignment means for demountably supporting the beam splitter means across the point of intersection of the optical axis of the camera and the optical axis of the projector.

2. The system of claim 1 wherein the beam splitter means comprises:
   a beam splitter for directing reflecting a portion of the luminous flux from the projector onto the same optical axis as the camera;
   baffle means for absorbing luminous flux from the projector that is transmitted by the beam splitter; and
   beam splitter support means for attaching the beam splitter to the projector.

3. The system of claim 2 wherein the beam splitter support means comprises:
   a beam splitter mount adapted to be pivotally supported on a shaft; and
   a positioning arm extending from the beam splitter mount.

4. The system of claim 3 wherein the alignment means comprises:
   a pivot shaft to engage the beam splitter mount;
   shaft adjusting means for moving the shaft transverse to the optical axis of the camera;
   pivot shaft position securing means;
   adjusting cam means abutting the positioning arm for rotating the beam splitter about the pivot shaft;
   adjusting cam set means for securing the adjusting cam means; and
   locator means for urging the positioning arm against the adjusting cam to secure the location of the beam splitter.

5. The system of claim 4 wherein the locator means further comprises:
   a locator arm adapted to engage the positioning arm;
   spring arm means coupled to the locator so that it and the locator move together;
   means for defining path of travel of the spring arm means and locator arm;
   a spring arm stop to limit the travel of the spring arm means;
   spring means fixed at one end relative to the spring arm stop and attached at the other end to the spring arm for urging the spring arm towards the spring arm stop.

6. The system of claim 4 wherein the baffle means includes a baffle stop adapted to contact the camera when the front screen system is assembled.

7. In combination:
   a first reflecting surface;
   a camera including an objective lens, the optical axis of which intersects the reflecting surface;
   a projector for projecting an image, the projector including focusing lens with an optical axis;
   mounting shoe means attached to the camera;
   mounting foot means attached to the projector adapted to detachably engage the mounting shoe means for positioning the camera and the projector relative to one another upon assembly such that the optical axis of the camera and the optical axis of the projector intersect at the same point relative to the camera and the projector;
   quick release lever means for locking the mounting foot means into the mounting shoe means;
   beam splitter means disposed for reflecting an image projected by the projector toward the first reflecting surface and a portion of luminous flux from the first reflecting surface is transmitted through the beam splitter to the camera objective; and
   adjusting means adapted to disengageably support and to repeatedly position the beam splitter so that the projected optical axis of the camera becomes coincident with the projected optical axis of the projector form the point of reflection of the projected image off the beam splitter.

8. The combination of claim 7 wherein the beam splitter further comprises:
   a beam splitter plate for directing a reflection of a portion of the luminous flux from the projector on the same optical axis as the camera;
   baffle means for absorbing luminous flux from the projector that is transmitted by the beam splitter plate; and
   beam splitter support means for attaching the beam splitter plate to the projector.

9. The combination of claim 8 wherein the beam splitter support means further comprises:
   a beam splitter mount adapted to be pivotally supported on a shaft;
   positioning arm means attached to the beam splitter mount.

10. The combination of claim 9 wherein the position adjustment means further comprises:
    a pivot shaft to engage the beam splitter mount;
    shaft adjusting means for moving the shaft transverse to the optical axis of the camera;
    pivot shaft position securing means;
    adjusting cam means for contacting the positioning arm means;
    adjusting cam set means for securing the adjusting cam means; and locator means for urging the positioning arm means against the adjusting cam.

11. The combination of claim 10 wherein the locator means further comprises:
   a locator arm adapted to engage the positioning arm means;
   a spring arm coupled to the locator arm so that it and the locator arm move together;
   means for determining the travel of the locator arm and the spring arm;
   a spring arm stop to limit the travel of the spring arm; and
   spring means fixed at one end and relative to the spring arm stop and attached at the opposite end to the spring arm for urging the spring arm towards the spring arm stop.

12. A front screen projection system comprising:
   a camera with an optical axis;
   a projector with an optical axis;
   mounting shoe means attached to the camera;
   mounting foot means attached to the projector for detachably engaging the mounting shoe means, whereby the optical axis of the camera and the optical axis of the projector can be caused to intersect;
   manipulable locking means for locking the mounting foot means in the mounting shoe means;
   a beam splitter for substantially superimposing the optical axis of the camera and the optical axis of the projector;
   beam splitter support means for attaching the beam splitter to the projector, including, a beam splitter mount adapted to be pivotally supported on a shaft and a positioning arm extending from the beam splitter mount;
   a pivot shaft for engaging the beam splitter mount;
   shaft adjusting means for moving the shaft transversely with respect to the optical axis of the camera;
   pivot shaft position securing means;
   adjusting cam means abutting the positioning arm for effecting rotation of the beam splitter about the pivot shaft;
   adjusting cam locking means for securing the position of the adjusting cam means; and
   locator means for urging the positioning arm against the adjusting cam to secure the position of the beam splitter.

13. The system of claim 12 wherein the locator means further comprises:
   a locator arm adapted to engage the positioning arm;
   spring arm means coupled to the locator so that it and the locator move together;
   means for defining path of travel of the spring arm means and locator arm;
   a spring arm stop to limit the travel of the spring arm means;
   spring means fixed at one end relative to the spring arm stop and attached at the other end to the spring arm for urging the spring arm towards the spring arm stop.

14. The system of claim 12 wherein the baffle means includes a baffle stop adapted to contact the camera when the front screen system is assembled.

15. In combination:
   a reflecting surface;
   a camera including an objective lens, a projected optical axis of which intersects the first reflective surface;
   a projector including a focusing lens for projecting an image on an optical axis;
   means for attaching the camera and the projector causing the optical axis of camera and the optical axis of the projector to intersect at substantially right angles, the attaching means including:
      mounting shoe means attached to the camera,
      mounting foot means attached to the projector adapted to engage the mounting shoe means, and
      manipulable locking means for locking the mounting foot means and mounting shoe means;
   a beam splitter for superimposing the optical axis of the camera and the optical axis of the projector;
   a beam splitter mount adapted to be pivotally supported on a shaft;
   positioning arm means attached to the beam splitter mount;
   a pivot shaft for engaging the beam splitter mount;
   shaft adjusting means for moving the shaft transversely to the optical axis of the camera;
   pivot shaft position securing means; adjusting cam means for contacting the positioning arm means;
   adjusting cam set means for securing the adjusting cam means in selected positions; and
   locator means for urging the positioning arm means against the adjusting cam.

16. The combination of claim 15 wherein the locator means further comprises:
   a locator arm adapted to engage the positioning arm means;
   a spring arm coupled to the locator arm so that it and the locator arm move together;
   means for determining the travel of the locator arm and the spring arm;
   a spring arm stop to limit the travel of the spring arm; and
   spring means fixed at one end and relative to the spring arm stop and attached at the opposite end to the spring arm for urging the spring arm towards the spring arm stop.

* * * * *